United States Patent [19]
Belville et al.

[11] Patent Number: 5,828,833
[45] Date of Patent: Oct. 27, 1998

[54] METHOD AND SYSTEM FOR ALLOWING REMOTE PROCEDURE CALLS THROUGH A NETWORK FIREWALL

[75] Inventors: Daniel R. Belville, Schwartz Creek; George R. Goble, Troy, both of Mich.

[73] Assignee: Electronic Data Systems Corporation, Plano, Tex.

[21] Appl. No.: 700,617

[22] Filed: Aug. 15, 1996

[51] Int. Cl.$^6$ .................................................. G06F 12/14
[52] U.S. Cl. ....................................................... 395/187.01
[58] Field of Search ............................... 395/187.01, 186, 395/200.31, 200.55, 200.59, 684; 340/825.34; 711/154, 163

[56] References Cited

U.S. PATENT DOCUMENTS

| | | | |
|---|---|---|---|
| 5,455,953 | 10/1995 | Russell | 395/739 |
| 5,541,911 | 7/1996 | Nilakantan et al. | 370/13 |
| 5,544,322 | 8/1996 | Cheng et al. | 395/200.12 |
| 5,550,984 | 8/1996 | Gelb | 395/200.17 |
| 5,606,668 | 2/1997 | Shwed | 395/200.11 |
| 5,608,662 | 3/1997 | Large et al. | 364/724.01 |
| 5,623,601 | 4/1997 | Vu | 395/187.01 |
| 5,649,099 | 7/1997 | Theimer et al. | 395/187.01 |
| 5,699,513 | 12/1997 | Feigen et al. | 395/187.01 |
| 5,706,427 | 1/1998 | Tabuki | 395/187.01 |
| 5,708,780 | 1/1998 | Levergood et al. | 395/200.12 |

FOREIGN PATENT DOCUMENTS

| | | | |
|---|---|---|---|
| 0 658 837 A2 | 6/1995 | European Pat. Off. | G06F 1/00 |

OTHER PUBLICATIONS

Chapman et al., "Building Internet Firewalls", O'Reilly & Associates, ISBN: 1–56592–124–0, pp. 168–188, 1995.

Siyan et al., "Internet Firewalls and Network Security", New Riders Publishing, ISBN: 1–56205–437–6, pp. 298–327, Jan. 1995.

Microsoft Press Computer Dictionary, 2nd Ed., Definition of "Table", p. 383, ISBN: 1–55615–597–2, 1994.

Dalpee et al., "Beyond RPC: The Virtual Network", IEEE Parallel & Distributed Technology, vol. 1, ISS. 4, pp. 41–57, Nov. 1993.

Cheswick, "The Design of a Secure Internet Gateway," Proceedings of the USENIX Summer 1990 Conference, pp. 233–237, Jun. 1990.

Chapman, "Network (In)Security Through IP Packet Filtering," Proceedings of the Third USENIX UNIX Security Symposium, pp. 1–14, Sep. 1992.

Intellisoft, Aug. 1996 by Jonathan Chinitz and Steve Sonnenberg entitled "Snare Works: A Transparent Security Framework for TCP/IP and Legacy Applications: An Intellisoft White Paper". pp. 1–14.

IEEE Communications Magazine, vol. 32, No. 9, 1 Sep. 1994, pp. 50–57 by Bellovin et al. entitled "Network Firewalls".

*Primary Examiner*—Robert W. Beausoliel, Jr.
*Assistant Examiner*—Stephen C. Elmore
*Attorney, Agent, or Firm*—David G. Wille; L. Joy Griebenow

[57] ABSTRACT

The invention comprises a method and system for allowing remote procedure calls through a network firewall. In accordance with an embodiment of the method of the invention, a request is received from an application server to allow remote procedure calls to pass through a firewall. The request is processed to determine whether the application server is authorized to receive remote procedure calls that have passed through the firewall. If the application server was authorized, then an identification of the application server is placed in a filter table associated with the firewall and remote procedure calls are allowed to pass through the firewall to the application server if the identification of that application server appears in the filter table.

28 Claims, 4 Drawing Sheets

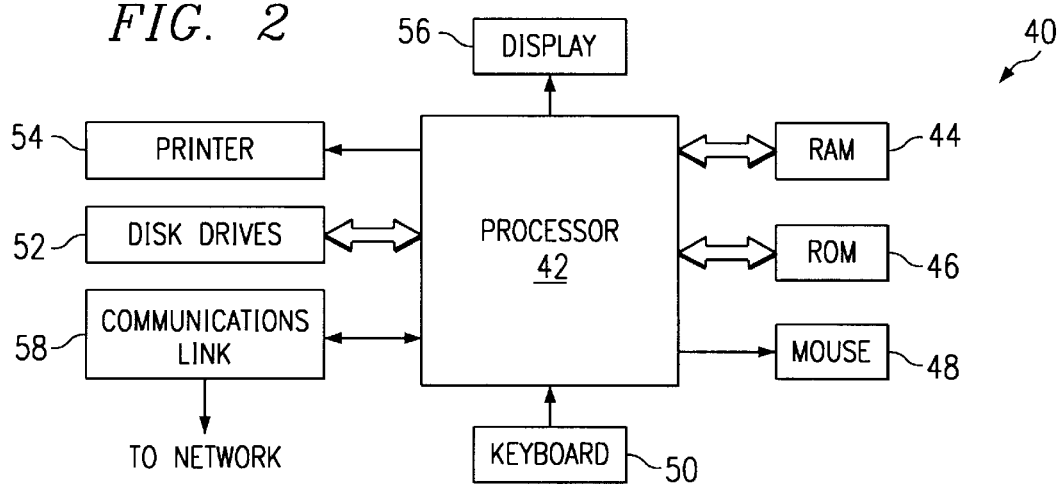
FIG. 2
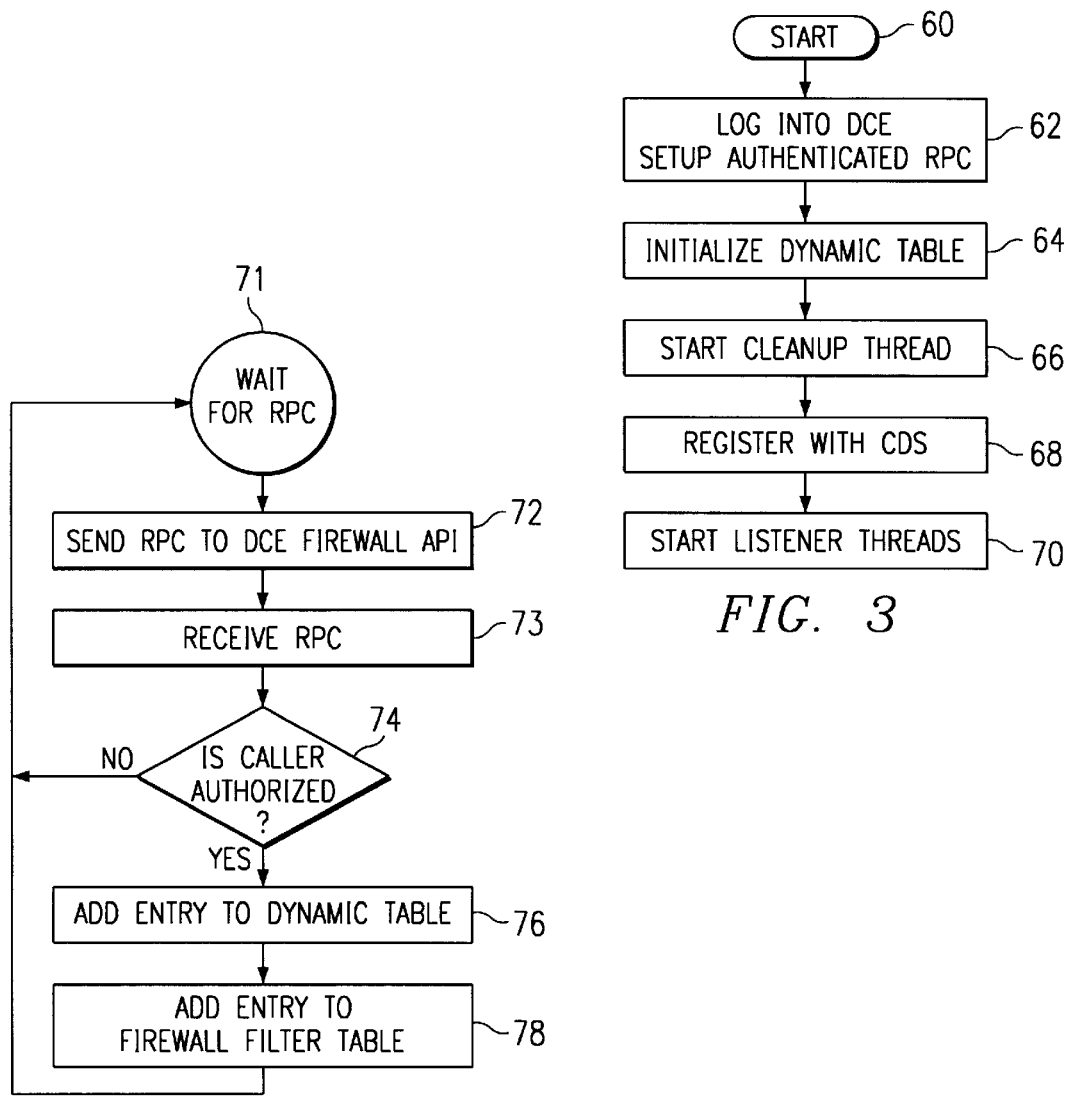
FIG. 3
FIG. 4

METHOD AND SYSTEM FOR ALLOWING REMOTE PROCEDURE CALLS THROUGH A NETWORK FIREWALL

TECHNICAL FIELD OF THE INVENTION

This invention relates generally to computer networks and more specifically to a method and system for allowing remote procedure calls through a network firewall.

BACKGROUND OF THE INVENTION

Because of concerns regarding the security of their local area computer networks, many local area network operators employ software applications known as firewalls at a gateway between their local area network and the outside world. For example, a firewall will often be used between a local area network and the Internet. The firewall application prevents traffic from outside of a network to travel within the protected local area network except under certain circumstances.

As large organizations throughout the world have begun to build computer applications that extend throughout the enterprise and beyond to interface with customers and suppliers, there is an increasing need for computers outside of a local area network to have access to data and applications within a local area network. At the same time, however, any information available to customers and suppliers should be carefully guarded to prevent it from being used improperly. If proper security is not employed, then someone from outside of an organization might improperly access sensitive information on the local area network, alter that information, and/or destroy that information.

Unfortunately, many existing firewall programs are incapable of supporting remote procedure calls from a location outside of the network through the firewall to a location inside of the local area network. As the use of client/server applications increases, there is an increasing need for firewalls to support remote procedure calls. Other existing firewalls will allow certain remote procedure calls to pass through the firewall. Unfortunately, existing mechanisms often allow only those remote procedure calls intended for procedures that the network administrator has statically authorized for passage through the firewall. The identification of authorized procedures results in a static list of traffic that may pass through the firewall. Unfortunately, such a static list may result in an unsecured local area network as any process outside the network may be able to access procedures within the network. Because unauthorized users may obtain access to these procedures, security is compromised.

SUMMARY OF THE INVENTION

The invention comprises a method and system for allowing remote procedure calls through a network firewall. In accordance with the method of the invention a request is received from an application server to allow remote procedure calls to pass through a firewall. The request is processed to determine whether the application server is authorized to receive remote procedure calls that have passed through the firewall. If the application server is authorized, then an identification of the application server is placed in a filter table associated with the firewall. Remote procedure calls are allowed to pass through the firewall to the application server if the identification of the application server was placed in the filter table.

The invention has several important technical advantages. The invention allows a firewall to be dynamically controlled to allow remote procedure calls to pass to specific application servers. The list of application servers is dynamic, thus allowing greater control over traffic through the firewall and improving overall security. The invention employs the robust security model of the distributed computing environment (DCE) which is standards based middleware for client server applications. One embodiment of the invention further improves network security by employing DCE security services so as to allow only DCE traffic to pass through the firewall.

Control over which application servers are authorized to receive remote procedure calls through the firewall is itself placed in the hands of an application employing DCE. Thus, the mechanism that determines authorization for remote procedure calls is itself a secure application. Accordingly, the invention provides a way to allow access to applications and data from outside of the local area network in a secure manner. The dynamic nature of the invention allows application servers themselves to request and receive permission to receive remote procedure calls from outside of the network. Human intervention is not required each time that an application server desires such access.

One embodiment of the invention also allows the firewall to be further dynamically controlled to allow only remote procedure calls that originate from specific clients to pass through the firewall. Firewall filtering may thus be based upon both the source (client) of a remote procedure call and its destination (server). By allowing only remote procedure calls to pass through the firewall where both the client and server are authorized for such a privilege, this embodiment of the invention provides yet another layer of network security. This embodiment of the invention also employs DCE security and allows the use of a dynamic authorization mechanism.

BRIEF DESCRIPTION OF THE DRAWINGS

For a more complete understanding of the present invention and the advantages thereof, reference is now made to the following descriptions, taken in conjunction with the accompanying drawings in which:

FIG. 2 illustrates a general purpose computer that may be used in the networks of FIG. 1;

FIG. 3 illustrates a flow chart describing the steps of one method of initializing a dynamic firewall configuration application in accordance with the invention;

FIG. 4 illustrates a flow chart describing the steps of one method of registering an application server in accordance with the invention;

DETAILED DESCRIPTION OF THE INVENTION

The preferred embodiment of the present invention and its advantages are best understood by referring to FIGS. 1 through 7 of the drawings, like numerals being used for like and corresponding parts of the various drawings.

Figure 1:
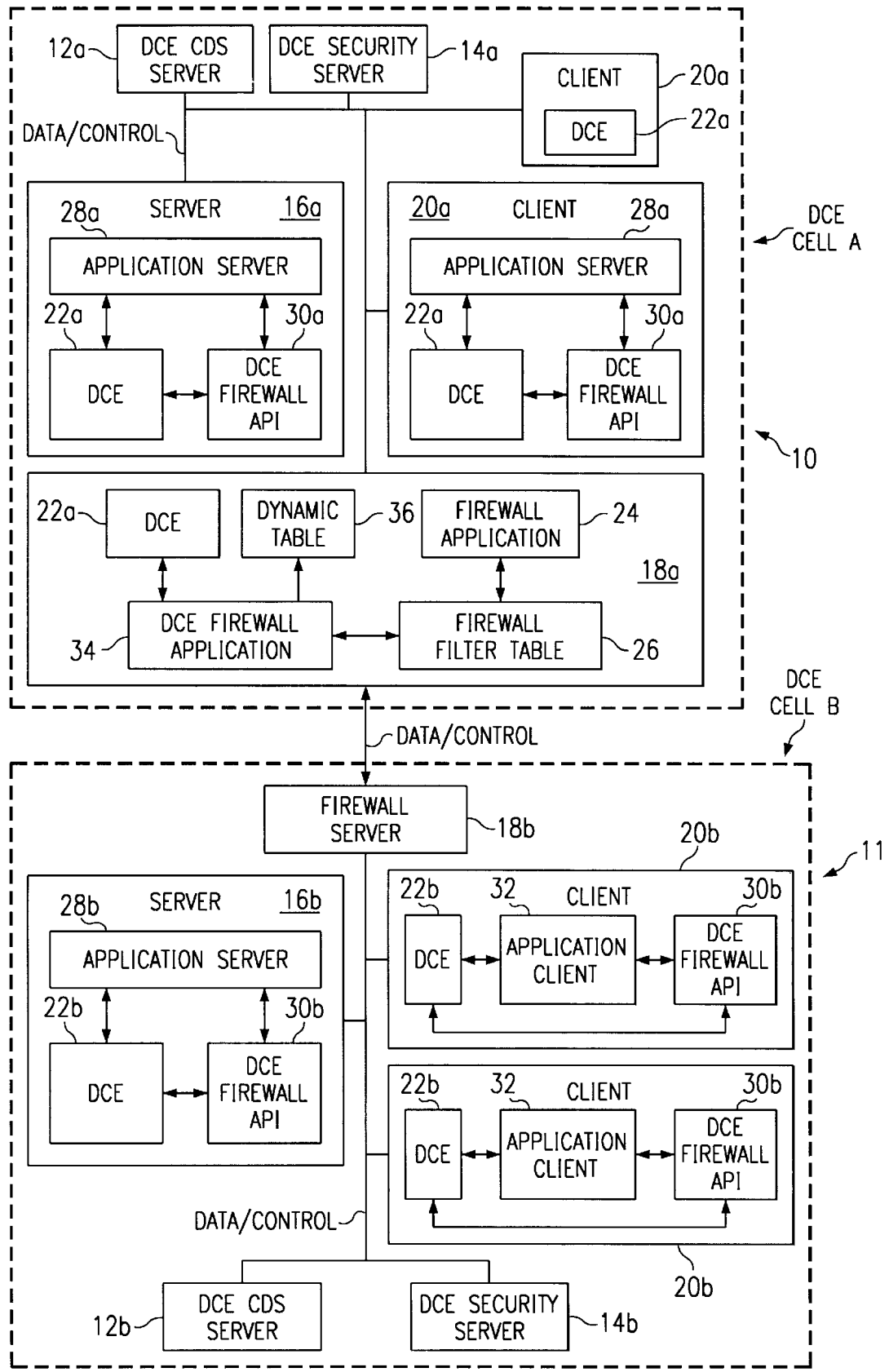
FIG. 1 illustrates a diagram of two computer networks that support remote procedure calls through a network firewall in accordance with one embodiment of the invention.

FIG. 1 illustrates a first computer network 10 connected to a second computer network 11. Computer network 10 comprises a distributed computing environment (DCE) cell. In this embodiment, computer network 10 may be referred to as DCE cell A. Computer network 11 comprises a second DCE cell. Computer network 11 may also be referred to as DCE cell B. Although the present invention is illustrated as employing DCE, the invention could be used in other computer networks that do not employ DCE.

First computer network 10 is coupled to second computer network 11 through network gateways comprising firewall servers 18 in this embodiment. The invention allows remote procedure calls from application clients in first computer network 10 to pass through the firewall servers 18 and access remote procedures that reside on application servers in second computer network 11. Similarly, the invention allows remote procedure calls from application clients in second computer network 11 to remote procedures residing in application servers in first computer network 10. The discussion below describes one embodiment of a mechanism to allow such remote procedure calls to occur.

This embodiment of the invention employs DCE. DCE allows computers of different types to communicate and provides services such as time services, security services, directory services, services for remote procedure calls, and other services for communications in a client server environment. DCE provides security for the client/server environment because it uses encryption and authenticates users through a series of calls with key exchanges. The log-in process for DCE is hidden to the outside world, also increasing security.

DCE uses random port assignments so it is difficult to use an existing firewall to allow remote procedure calls using DCE through such a firewall. The invention allows dynamic updates of a firewall filter table, thus allowing dynamic control over which DCE application servers may receive remote procedure calls through the firewall and/or which DCE application clients may send remote procedure calls through the firewall.

For purposes of this application, the term "application server" is used in a broad sense to refer to computer software that may receive a remote procedure call in a client server environment. Similarly, the term "application client" is used in a broad sense to refer to computer software that is capable of generating a remote procedure call to an application server in a client server environment. The term "server" refers to a server computer that may contain a number of resources shared among clients in a client server environment. However, a server could be any computer connected to a computer network. Similarly, the term "client" refers to a computer that may access shared resources on a client server environment. However, a client computer may comprise any computer connected to a computer network.

Because this embodiment of the invention uses DCE, first computer network 10 and second computer network 11, each include a DCE cell directory service (CDS) server 12 and a DCE security server 14. DCE cell directory service server 12 serves as a central repository for directory information and can find the location of services in a particular DCE cell. Thus, a client employing DCE uses the name of a particular service to find that service. DCE CDS server 12 resolves the Internet protocol (IP) address of the service after receiving a request for that service by name. Cell directory services are dynamic. Any service that wishes to allow access to itself registers with DCE CDS server 12 and application clients seeking access to that service obtain the address from DCE CDS server 12.

DCE security server 14 provides for secured access to application servers employing DCE. When an application server desires to allow access through DCE, it registers with DCE CDS server 12 and DCE security server 14. DCE security server 14 associates a key with an application server and an application client seeking access to that application server must obtain the key to talk to the application server. The invention allows application clients from outside of a particular DCE cell to make remote procedure calls through a firewall to application servers within the cell. Thus, client applications from outside the cell seeking access to application servers within the cell obtain keys to access the application servers from DCE security server 14 and obtain the proper address of the application server from DCE CDS server 12.

DCE CDS server 12 and DCE security server 14 reside on different computers in this embodiment. DCE CDS server 12 and DCE security server 14, however, could reside on the same computer without departing from the scope of the invention. Similarly, DCE CDS server 12 and/or DCE security server 14 might also reside on firewall server 18 without departing from the scope of the invention. DCE CDS server 12 preferably refers to a software application as opposed to a server computer. Similarly, DCE security server 14 preferably refers to a software application as opposed to a server computer. However, firewall server 18 preferably refers to a server computer.

First computer network 10 and second computer network 11 further comprise a series of server computers 16 and client computers 20. Each server computer 16 and client computer 20 operate using the distributed computing environment 22. Distributed computing environment 22 could be omitted without departing from the scope of the invention.

Each server computer 16 and/or client computer 20 may include one or more application servers 28 that comprise computer software operable to receive remote procedure calls from a different computer in the computer network. Similarly, each server computer 16 and/or client computer 20 may include one or more application clients 32 that are operable to generate a remote procedure call to one of the application servers 28 in a computer connected to the computer network. Application servers 28 may reside on either server computers 16, or client computers 20, or both. Similarly, application clients 32 may reside on either server computers 16, client computers 20 or both.

Each firewall server 18 comprises a firewall application 24 that serves as a network gateway controlling the flow of data from outside of one of the computer networks into that computer network. One function of firewall application 24 may be to allow certain remote procedure calls to pass through the firewall into the computer network. Firewall application 24 may maintain a firewall filter table 26 to indicate the remote procedure calls that are allowed to pass through the computer network. In this embodiment, firewall filter table 26 comprises an identification of application servers in the computer network guarded by firewall application 24 that are allowed to receive remote procedure calls from outside of the computer network, as well as an identification of application clients that are allowed to make remote procedure calls from outside of the computer network to application servers within the computer network. Firewall filter table 26 may comprise a single filter table or a series of filter tables. For example, in this embodiment, a filter table for authorizing application servers and a filter table for authorizing application clients may be maintained separately. These and other methods of filtering within firewall server 18 are within the scope of the invention. In this embodiment, an identification in firewall filter table 26 comprises an IP address, service port information, and IP protocol information. More or less information identifying an application server or application client could appear in firewall filter table 26 without departing from the scope of the invention. For this embodiment of the invention, firewall application 24 comprises the firewall 1 application available from Checkpoint Software Technologies, Inc. Other firewall applications 24 may be used without departing from the scope of the invention.

To dynamically control firewall filter table 26 and provide adequate security to a computer network, DCE firewall application 34 is used to update firewall filter table 26. DCE firewall application 34 is itself a DCE application. DCE firewall application 34 maintains dynamic table 36 to keep track of which application servers 28 are allowed to receive remote procedure calls through the firewall guarding the network and which application clients 32 from outside of the network are allowed to make remote procedure calls to application servers 28 within the network. In this embodiment, dynamic table 36 is a tree-like data structure that maintains the privileges assigned to various application servers 28 as well as the status of those application servers 28. Dynamic table 36 also maintains a list of those application clients 32 that are allowed to make calls through the firewall from outside of the network to a particular application server 28. Each application server 28 may have its own list of application clients 32 with the privilege of making remote procedure calls to that application server 28 from outside of the network. This embodiment of dynamic table 36 uses an access control list (ACL) mechanism to determine which application servers 28 are authorized to receive remote procedure calls through the firewall. It also uses an ACL mechanism to determine which application clients 32 are authorized to send remote procedure calls through the firewall from outside of the network.

Although more detailed operation of DCE firewall application 34 will be discussed in connection with FIGS. 3 through 7 below, an overview of its operation will now be provided. DCE firewall application 34 dynamically updates firewall filter table 26 with the identification of DCE authenticated application servers 28 and DCE authenticated application clients 32. DCE firewall application 34 interacts with DCE cell directory services server 12 and DCE security server 14 for the DCE cell in which DCE firewall application 34 resides. Application servers 28 desiring to receive remote procedure calls through the firewall guarding the network, use a remote procedure call, in this embodiment, to request such privileges from DCE firewall application 34. DCE firewall application 34 uses the DCE authentication process and information stored by the network administrator in dynamic table 36 to determine whether the application server is authorized to receive remote procedure calls that have passed through the firewall. If the application server is authorized, then DCE firewall application 34 updates firewall filter table 26 with an identification of the application server to allow DCE remote procedure calls to the application server to pass through the firewall. Dynamic table 36 is also updated.

Similarly, application clients 32 desiring to receive remote procedure calls through the firewall guarding the network, use a remote procedure call to request such privileges from DCE firewall application 34. DCE firewall application 34 uses the DCE authentication process and information stored by the network administrator in dynamic table 36 to determine whether the application client is authorized to send remote procedure calls through the firewall from outside of the network. If the application server is authorized, then DCE firewall application 34 updates firewall filter table 26 with an identification of the application client to all DCE remote procedure calls from the application client to pass through the firewall. Dynamic table 36 is also updated.

For a given application server, then, multiple levels of security are possible. An application server may, at the option of the network administrator, receive remote procedure calls through the firewall regardless of what application client made the call. If greater security is desired, then a set of application clients may be associated with an authorized application server such that only those application clients may make remote procedure calls to that application server from outside of the network. The level of security may be specified by the network administrator.

This embodiment of DCE firewall application 34 is a multi-threaded application. One thread of the DCE firewall application 34 is used to register application servers 28 for passage of remote procedure calls to those application servers 28 through the firewall. This thread is also used to register application clients. Another thread of DCE firewall application 34 is used to unregister application servers 28 so as to deny passage of remote procedure calls through the firewall to those application servers 28. This thread is used to remove an application server 28 when that application server has ceased functioning or desires to temporarily block access to itself from outside of the computer network. Similarly, this thread may be used to unregister an application client.

DCE firewall application 34 also includes a clean-up thread. In this embodiment, the clean-up thread periodically pings application servers 28 that are presently listed in the firewall filter table 26 as being able to receive remote procedure calls through the firewall. Pinging allows the cleanup thread to determine if these application servers 28 are still present and operable. Those application servers 28 that do not respond to the ping are disabled from receiving further remote procedure calls by removing their identification from firewall filter table 26 and updating dynamic table 36 to reflect their status. In this embodiment, the clean-up thread of DCE firewall application 34 may also be used to ping the firewall application 24 to make sure that the firewall application 24 is still operable. The clean-up thread may also examine firewall filter table 26 and compare the table to dynamic table 36 to verify that these tables are consistent with one another. If firewall filter table 26 is inconsistent, it is preferably updated to reflect the state of dynamic table 36. This aspect of DCE firewall application 34 will also allow proper recovery if firewall application 24 ceases to function.

The cleanup thread may also include a timeout check for application clients 32. In this embodiment, the timeout interval is five minutes but is configurable by the network administrator. After the timeout interval has passed, if an application client 32 has not made a remote procedure call during that time period, its remote procedure call privileges are removed and the firewall filter table 26 and dynamic table 36 are updated accordingly.

Finally, DCE firewall application 34 preferably includes an administrative thread that is used to allocate privileges to application servers 28 and application clients 32. A network administrator may grant privileges for certain application servers 28 to receive remote procedure calls through the firewall if they meet certain criteria. Similarly, privileges may be granted to certain application clients to send remote procedure calls through the firewall from outside of the network. The network administrator may then use the administrative thread of DCE firewall application 34 to update dynamic table 36 to reflect these privileges. In this embodiment, the administrative thread of DCE firewall application 34 is itself a DCE application server 28. Because this thread is a DCE application server 28, it may be accessed by any computer in the computer network.

FIG. 2 illustrates a general purpose computer 40 that may be used for any one or all of: (1) the computer on which DCE CDS server 12 resides, (2) the computer on which DCE security server 14 resides, (3) server computers 16, (4) client computers 20, and (5) firewall server 18. Computer 40 may be adapted to execute any of the well-known MSDOS and/or WINDOWS available from Microsoft Corporation, PCDOS and/or OS2 available from International Business Machines Corporation., UNIX available from American Telephone and Telegraph Co., and/or MAC-OS available from Apple Computer, Inc. operating systems or any other operating system. Computer 40 comprises processor 42, random access memory (RAM) 44, read only memory (ROM) 46, mouse 48, keyboard 50 and input/output devices, such as printer 54, disk drives 52, display 56, and communications link 58. The present invention includes computer software that may be stored in RAM 44, ROM 46, or disk drives 52 and is executed by processor 42. Communications link 58 is connected to either first computer network 10 or second computer network 11 but could also be connected to a telephone line, an antenna, a gateway, or any other type of communications link. Disk drives 52 may include a variety of types of storage media such as, for example, floppy disk drives, hard disk drives, CD ROM drives, or magnetic tape drives. Computer 40 may be any type of computer such as a personal computer, workstation, mini-computer, and/or mainframe computer.

FIG. 3 illustrates a flow chart of the steps used to initialize an embodiment of DCE firewall application 34. After the procedure starts in step 60, DEC firewall application 34 logs into DCE in step 62. Also in step 62, DCE firewall application 34 sets up authenticated remote procedure calls with DCE security server 14. This step allows DCE firewall application 34 itself to receive DCE authenticated remote procedure calls from application servers 28 desiring to register with DCE firewall application 34 to receive remote procedure calls through the firewall.

In step 64, dynamic table 36 is initialized. Those application servers 28 and application clients 32 that are indicated as currently active in dynamic table 36 will be placed in firewall filter table 26. In this embodiment, dynamic table 36 is stored on disk so that if DCE firewall application 34 crashes, then the previous state of firewall filter table 26 may be restored at initialization time. After step 64, the clean-up thread of DCE firewall application 34 is started in step 66. The operation of the clean-up thread will be described more fully in connection with FIG. 6 below. Continuing with FIG. 3, in step 66, DCE firewall application 34 registers with DCE cell directory services server 12 so that application servers 28 desiring to make remote procedure calls to DCE firewall application 34 can determine where DCE firewall application 34 is located. Finally, in step 70, the listener threads are started. The operation of the listener threads will be described in connection with FIGS. 4, 5, and 7 below.

FIG. 4 illustrates a flow chart describing the operation of one embodiment of a listener thread for registration of application servers 28 or application clients 32 with DCE firewall application 34. This listener thread handles the registration of application servers 28 to allow passage of remote procedure calls through the firewall. Similar steps are used to register application clients 32 from outside of the network to make remote procedure calls through the firewall. Operation of this embodiment begins in step 71 where DCE firewall application 34 waits for a remote procedure call from one of the application servers 28 or application clients 32.

When an application server 28 or application client 32 desires to register with DCE firewall application 34 to enable remote procedure calls through the network firewall, it sends a request to do so to the listener thread of DCE firewall application 34 that is responsible for registering application servers 28 and application clients 32. Note that the a separate listener thread could be provided for clients and servers. Application server 28 or application client 32 makes the request by generating a call to DCE firewall applications program interface (API) 30 at step 72. DCE firewall applications program interface 30, in turn, generates a remote procedure call to DCE firewall application 34. In this embodiment, the remote procedure call from DCE firewall API 30 to DCE firewall application 34 is itself a DCE secured remote procedure call.

After a remote procedure call requesting registration has been received at step 73, then it is determined in step 74 whether the calling application server 28 or application client 32 is authorized to receive remote procedure calls that pass through the firewall. The authorization process will be described in more detail in connection with FIG. 7 below. If the caller is not authorized, then the procedure continues in step 72 where the registration thread waits for an additional remote procedure call. If the calling application server 28 is authorized to receive remote procedure calls through the firewall, then an appropriate entry is added to the dynamic table 36 in step 76. Then, in step 78, the appropriate entry is added to firewall filter table 26. An application server 28 that requested registration may now receive remote procedure calls. An application client 32 that requested registration may now generate remote procedure calls. The process then continues in step 72 where the listener thread waits for another remote procedure call.

Figure 5:
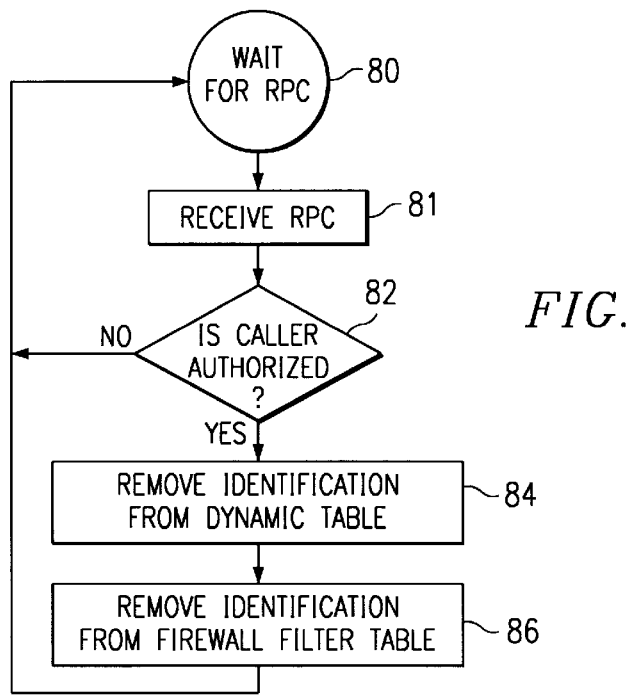
FIG. 5 illustrates a flow chart describing the steps of one method of unregistering an application server in accordance with the invention.

FIG. 5 illustrates a flow chart describing the operation of one embodiment of a listener thread for unregistering application servers 28 and application clients 32 in accordance with the invention. This listener thread also waits to receive a remote procedure call in step 80. Like the listener thread for registration described in connection with FIG. 4, this listener thread for unregistration may receive at step 81 request in the form of remote procedure calls from application servers 28 and application clients 32 desiring to unregister or disable a particular application server 28 or application client 32. The process is similar to that described above in connection with FIG. 4. Next, in step 82, it is determined whether the calling application server 28 or application client 32 is authorized to unregister the application server 28 or application client 32. If not, then the procedure continues in step 80 where the listener thread waits for another remote procedure call. Otherwise, in step 84, the entry is deleted from dynamic table 36 corresponding to the application server 28 or application client 32 to be unregistered or disabled. Then, in step 86, the indentification in firewall filter table 26 corresponding to the application server 28 or application client 32 to be unregistered or disabled is removed. The procedure then continues in step 80 where the listener thread for unregistering application servers 28 waits for additional remote procedure calls.

Figure 6:
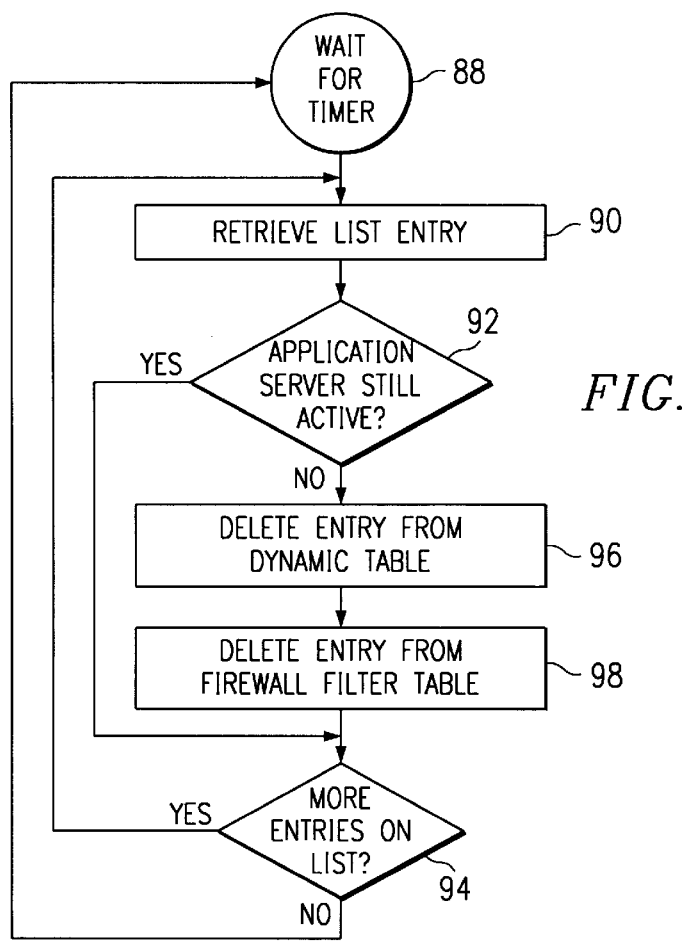
FIG. 6 illustrates a flow chart describing the operation of one embodiment of a cleanup thread of a dynamic firewall configuration application constructed in accordance with the invention.

FIG. 6 illustrates a flow chart of a clean-up thread of an embodiment of DCE firewall application 34 constructed in accordance with the invention. In this embodiment, the clean-up thread uses a timer to periodically determine whether firewall filter table 26 has an accurate list of application servers 28 allowed to receive remote procedure calls through the firewall. It also checks the list of application clients 32. The duration for which the timer is set is configurable by the administrator of the computer network. When the timer expires, a first entry is retrieved from the list of application servers 28 that are allowed to receive remote procedure calls. This list comprises part of dynamic table 36 in this embodiment. In step 92, it is determined whether the application server corresponding to the list entry retrieved from dynamic table 36 is still active. In this embodiment, the clean-up thread determines whether the application server is still active by pinging the application server 28 using a DCE remote procedure call ping. Other methods could be used to determine whether an application server 28 is still active without departing from the scope of the invention. If the application was still active, then it is determined whether there are more entries on the list in dynamic table 36 of active application servers that may receive remote procedure calls through the firewall. If not, then the timer is reset and the clean-up thread again waits for the timer to expire in step 88. If there are more entries on the list, then the next entry is retrieved in step 90.

If the application server was discovered to be inactive in step 92, then the entry corresponding to that application server 28 is deleted from dynamic table 36 in step 96. Next, the corresponding entry is deleted from firewall filter table 26 in step 98. The procedure then continues in step 94.

Application clients 32 are treated slightly differently. Either the cleanup thread or another thread may be used to monitor privileges for application clients 32. After an application client 32 has received privileges for making remote procedure calls through the firewall, the application client has a specified time interval to make such a procedure call. If no procedure call is made in that time, the application client 32 has its privileges removed. If a call is made during the time interval, then the application client 32 maintains its privileges until the expiration of the next time interval. In this embodiment, the time interval is configurable by the network administrator but will typically be set to approximately five minutes.

Figure 7:
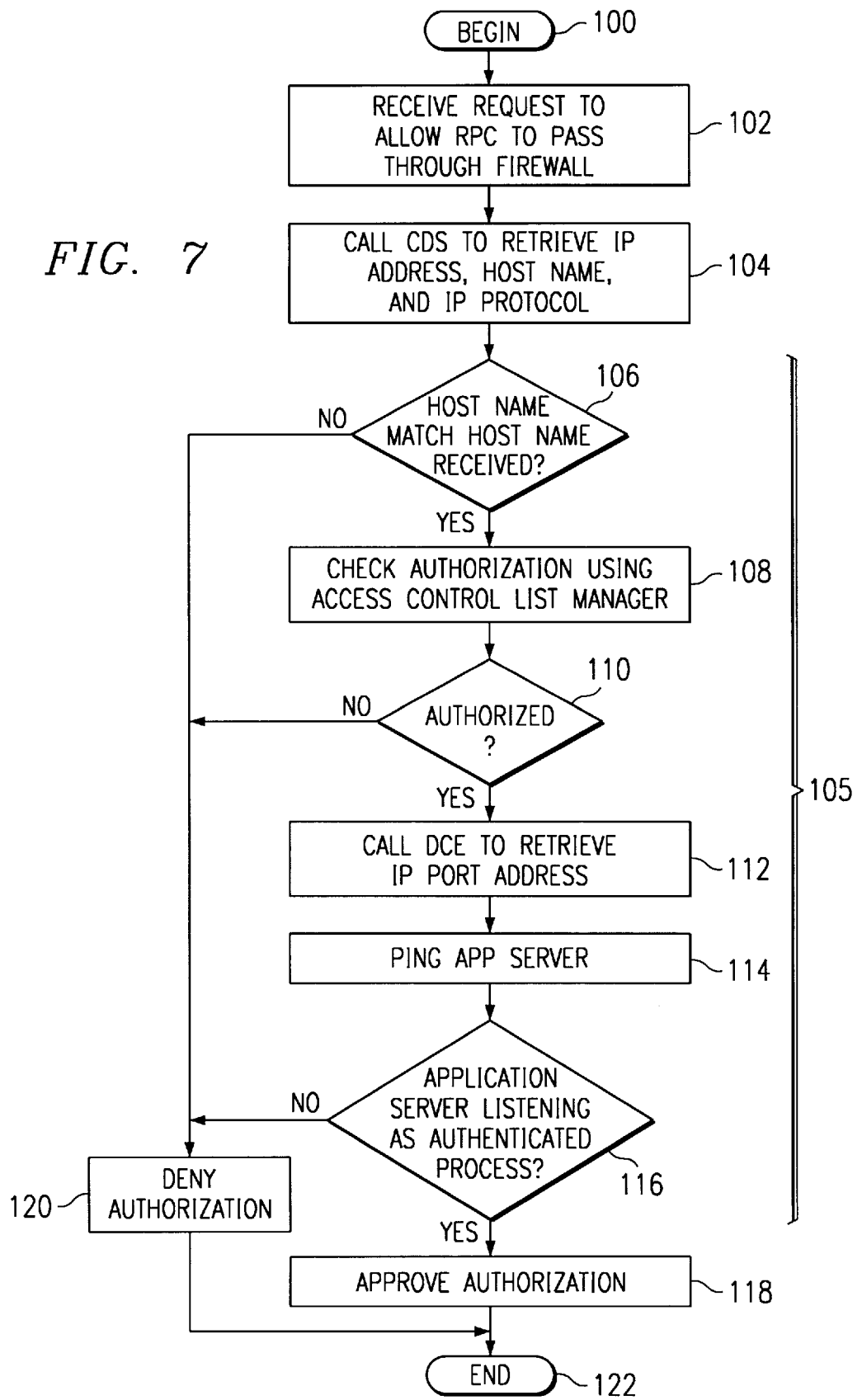
FIG. 7 illustrates a flow chart describing the steps of authorizing an application server to receive remote procedure calls through a firewall in accordance with one embodiment of the invention.

FIG. 7 illustrates the steps that may be used to authorize an application server 28 to either register itself or unregister itself with DCE firewall application 34 for receipt of remote procedure calls through the firewall. After the procedure begins in step 100, the cell directory services name, application server name, and host name of the application server 28 that generated the remote procedure call to DCE firewall application 34 are received in step 102. In step 104, DCE firewall application 34 calls the DCE CDS server 12 to retrieve the IP address, host name, and IP protocol for the application server 28 that generated the request. DCE firewall application 34 processes the request at step 105 to determine whether to pass the remote procedure call through the firewall. Processing step 105 begins at step 106, where DCE firewall application 34 determines whether the host name received from the application server 28 matches the host name received from DCE CDS server 12. If the names do not match, then authorization is denied in step 120 and the procedure terminates in step 122. If the host names do match, then in step 108, DCE firewall application 34 checks dynamic table 36 to determine whether application server 28 has been previously authorized to receive remote procedure calls through the firewall. This check is performed using an access control list (ACL) manager. In step 110, the result of the authorization check is determined. If the application server 28 was not authorized, then authorization is denied in step 120 and the procedure terminates in step 122. If the application server 28 is authorized, then in step 112, DCE firewall application 34 calls the distributed computing environment 22 of the computer on which application server 28 resides to retrieve the IP port address for the application server 28.

Next, in step 114, DCE firewall application 34 pings the application server 28. In step 116, it is determined based upon the results of the ping whether the application server is listening as a DCE authenticated process. If not, then authorization is denied in step 120 and the procedure terminates in step 122. If the application server is listening as a DCE authenticated process, then in step 118, the authorization for this application server 28 is approved and the procedure terminates in step 122. The procedure for authorizing an application server 28 may be used for either registration or unregistration of the application server 28. Other procedures could be used without departing from the scope of the invention.

A similar process to that of FIG. 7 may also be used to authorize application clients 32 to generate remote procedure calls that pass through the network. An ACL test is used that checks the application client's 32 privilege attribute certificate against the privilege information for the application server 28 with which it desires to communicate. If the application client 32 is authorized to communicate with that application server 28 or if the application server 28 is authorized to communicate with any application client 32, then the authorization is approved. The entry in the firewall filter table 26 for an application client 32 will contain the IP address and IP protocol for the application client but no port address. More or less information may be maintained without departing from the scope of the invention.

Although the present invention has been described in detail, it should be understood that various changes, substitutions, and alterations can be made hereto without departing from the spirit and scope of the invention as defined by the appended claims.

What is claimed is:

1. A method for allowing an application server to receive remote procedure calls through a network firewall, comprising:

receiving a request from the application server to allow remote procedure calls to pass through a firewall;

processing the request to determine whether the application server is authorized to receive remote procedure calls that have passed through the firewall;

placing an identification of the application server in a filter table associated with the firewall if the application server is authorized to receive remote procedure calls that have passed through the firewall; and allowing a remote procedure call to pass through the firewall to the application server if the identification of the application server was placed in the filter table.

2. The method of claim 1, wherein the application server comprises a distributed computing environment application server.

3. The method of claim 1, wherein the identification comprises an Internet protocol address, a service port identification, and a protocol identification.

4. The method of claim 1, further comprising:

updating a data structure if the application server is authorized to receive remote procedure calls that have passed through the firewall, wherein the data structure is used to monitor which application servers have been placed in the filter table.

5. The method of claim 4, further comprising:

determining whether the application server is still active;

removing the identification of the application server from the filter table if the application server is no longer active; and updating the data structure to reflect that the application server is no longer active if the application server was removed from the filter table.

6. The method of claim 5, wherein the application server comprises a distributed computing environment application server.

7. The method of claim 5, wherein the determining step further comprises determining on a periodic basis whether the application server is still active.

8. The method of claim 4, wherein the application server comprises a distributed computing environment application server, and wherein the processing step further comprises:

checking the data structure to see if the application server is authorized to receive remote procedure calls that have passed through the firewall;

retrieving the application server's Internet protocol port address using the distributed computing environment if the application server is authorized;

determining whether the application server is listening as an authenticated process if the application server is authorized; and approving the application server to receive remote procedure calls through the network if the application server is listening as an authenticated process.

9. The method of claim 1, further comprising:

receiving a request from an application server to disable remote procedure calls to the application server through the firewall;

removing the identification of the application server from the filter table in response to the request to disable.

10. A system for allowing an application server to receive remote procedure calls through a computer network firewall, comprising:

a computer-readable medium; and a computer program encoded on the computer-readable medium, the computer program further operable to receive a request from the application server to allow remote procedure calls to pass through a firewall;

process the request to determine whether the application server is authorized to receive remote procedure calls that have passed through the firewall; and place an identification of the application server in a filter table associated with the firewall if the application server is authorized to receive remote procedure calls that have passed through the firewall; and allow a remote procedure call to pass through the firewall to the application server if the identification of the application server was placed in the filter table.

11. The system of claim 10, wherein the application server comprises a distributed computing environment application server.

12. The system of claim 10, wherein the identification comprises an Internet protocol address, a service port identification, and a protocol identification.

13. The system of claim 10, wherein the computer program is further operable to:

update a data structure if the application server is authorized to receive remote procedure calls that have passed through the firewall, wherein the data structure is used to monitor which application servers have been placed in the filter table.

14. The system of claim 13, wherein the computer program is further operable to:

determine whether the application server is still active;

remove the identification of the application server from the filter table if the application server is no longer active; and update the data structure to reflect that the application server is no longer active if the application server was removed from the filter table.

15. The system of claim 14, wherein the application server comprises a distributed computing environment application server.

16. The system of claim 14, wherein the computer program is further operable to:

determine on a periodic basis whether the application server is still active.

17. The system of claim 13, wherein the application server comprises a distributed computing environment application server, and wherein the computer program is further operable to:

check the data structure to see if the application server is authorized to receive remote procedure calls that have passed through the firewall;

retrieve the application server's Internet protocol port address using the distributed computing environment if the application server is authorized;

determine whether the application server is listening as an authenticated process if the application server is authorized; and approve the application server to receive remote procedure calls through the network if the application server is listening as an authenticated process.

18. A system for allowing an application server to receive remote procedure calls through a computer network firewall, comprising:

a first computer;

a second computer;

a computer network connecting the first and second computer;

an application server program running on the second computer and operable to generate a request to receive remote procedure calls from outside of the computer network;

a firewall program running on the first computer and operable to determine whether a remote procedure call from outside of the computer network is allowed to pass through the computer network, the firewall program comprising a filter table wherein the firewall program allows remote procedure calls from outside of the computer network to pass through the computer network provided that those remote procedure calls are intended for an application server that is listed in the filter table; and a dynamic firewall configuration application running on the first computer and operable to process the request to determine whether the application server is authorized to receive remote procedure calls that have passed through the firewall and place an identification of the application server in the filter table if the application server is authorized to receive remote procedure calls that have passed through the firewall.

19. The system of claim 18, wherein the application server comprises a distributed computing environment application server and wherein the dynamic firewall configuration application comprises a distributed computing environment application server.

20. The system of claim 18, wherein the application server causes a request to be sent through the computer network to the dynamic firewall configuration application by calling an application program interface that is resident on the second computer.

21. The system of claim 18, wherein the dynamic firewall configuration application is further operable to:
update a data structure if the application server is authorized to receive remote procedure calls that have passed through the firewall, wherein the data structure is used to monitor which application servers have been placed in the filter table;
determine whether the application server is still active;
remove the identification of the application server from the filter table if the application server is no longer active; and
update the data structure to reflect that the application server is no longer active if the application server was removed from the filter table.

22. A method for allowing remote procedure calls through a network firewall, comprising:
receiving a request from an application client outside of a computer network to make remote procedure calls through the network firewall;
processing the request to determine whether the application client is authorized to generate remote procedure calls that pass through the network firewall;
placing an identification of the application client in a filter table associated with the firewall if the application client is authorized to generate remote procedure calls that pass through the network firewall; and
allowing all remote procedure calls from the application client to pass through the firewall while the identification of the application client remains in the filter table.

23. The method of claim 22, wherein the application client comprises a distributed computing environment application client.

24. The method of claim 22, wherein the identification comprises an IP address and an IP protocol identification.

25. The method of claim 22, further comprising:
updating a data structure if the application client is authorized to generate remote procedure calls that pass through the firewall, wherein the data structure is used to monitor which application clients have been placed in the filter table.

26. The method of claim 25, further comprising:
determining whether the application client has generated a remote procedure call during a time interval;
removing the identification of the application client from the filter table if the application client has not generated a remote procedure call during the time interval; and
updating the data structure to reflect that the application client is no longer active if the application client was removed from the filter table.

27. The method of claim 26, wherein the application client comprises a distributed computing environment application client.

28. The method of claim 22, further comprising:
receiving a request from an application server to allow remote procedure calls to the application server to pass through the network firewall;
processing the request to determine whether the application server is authorized to receive remote procedure calls that have passed through the firewall;
placing an identification of the application server in a filter table associated with the firewall if the application server is authorized to receive remote procedure calls that have passed through the firewall; and
allowing a remote procedure call from the application client to the application server to pass through the firewall if the identification of both the application client and application server were placed in the filter table.

* * * * *